US006104278A

United States Patent [19]
Altwasser

[11] Patent Number: 6,104,278
[45] Date of Patent: Aug. 15, 2000

[54] UNIVERSAL ANTI-THEFT DEVICE AND METHOD FOR PRODUCING IT

[75] Inventor: Richard Altwasser, Forst, Germany

[73] Assignee: Meto International GmbH, Hirschhorn, Germany

[21] Appl. No.: 09/075,845

[22] Filed: May 12, 1998

[30] Foreign Application Priority Data

May 12, 1997 [DE] Germany ........................... 197 19 434

[51] Int. Cl.[7] ........................................ H04Q 5/22

[52] U.S. Cl. ................................ 340/1.1; 342/44; 342/51

[58] Field of Search ......................... 340/825.54, 825.21, 340/825.31, 825.34, 572.1, 10.1; 342/22, 44, 51

[56] References Cited

U.S. PATENT DOCUMENTS 4,196,418 4/1980 Kip et al. ........................... 340/825.54
5,604,485 2/1997 Lauro et al. ....................... 340/825.54

*Primary Examiner*—Michael Tokar
*Assistant Examiner*—Jean B. Jeanglaude
*Attorney, Agent, or Firm*—Jones, Tullar & Cooper, P.C.

[57] ABSTRACT

The present invention relates to a universal anti-theft device for securing articles against theft, which has at least one electromagnetic resonant oscillating circuit (2) that, in the interrogation field of an article monitoring system, is excited to transmit a characteristic signal which subsequently trips an alarm and at least one further electromagnetic resonant oscillating circuit which contains specific, encoded information about the article. The present invention also relates to a method for producing the universal anti-theft device for securing articles against theft.

4 Claims, 4 Drawing Sheets

UNIVERSAL ANTI-THEFT DEVICE AND METHOD FOR PRODUCING IT

FIELD OF THE INVENTION

The present invention relates to a universal anti-theft device for securing articles against theft, which has at least one electromagnetic resonant oscillating circuit that, in the interrogation field of an article monitoring system, is excited to transmit a characteristic signal which subsequently trips an alarm, and to a method for producing the universal anti-theft device.

BACKGROUND OF THE INVENTION

Resonant oscillating circuits with resonant frequencies (RF) in the megahertz range are increasingly used for electronic theft protection. The primary field of use is in retail sales. Typically, they are made in the form of hang tabs or labels and are connected by machine or manually to the articles to be secured. Increasingly, however, so-called source integration is used; that is, the anti-theft device is already integrated with the article or its package during the production or packaging process.

European Patent Disclosure EP 0 665 705 A2 has already disclosed an RF anti-theft device, which comprises two conductive, spiral windings (spirals). The two spirals are separated from one another by a dielectric layer and are arranged such that they overlap at least partially.

Such resonant frequency anti-theft devices are highly flexible. Since they are moreover quite thin and flat, they can easily be provided with the desired imprint in printers. This imprint is used either for customer information or involves machine-readable information, preferably a bar code.

Bar codes are an economical solution, if the problem is to furnish machine-readable information. It is disadvantageous, in that a bar code must always be placed in the immediate vicinity of the bar code reader, due to optical principles, so that the bar code can be identified. Moreover, the bar code reader can decipher the information only if the bar code is freely accessible or in other words not concealed. The use of a source-integrated anti-theft device with a bar code will therefore make sense—if at all—only in exceptional cases.

OBJECT AND SUMMARY OF THE INVENTION

The object of the present invention is to provide an economical universal anti-theft device and a method for its production.

With regard to the universal anti-theft device, this object is attained in that at least one further electromagnetic resonant oscillating circuit is provided, which contains specific, encoded information about the article. This encoded information is available and "readable" via a remote interrogation. The remote interrogation is done for instance by means of a broad-band interrogation field, which encompasses the resonant frequencies of the resonant oscillating circuits contained in the universal anti-theft device. It can be easily appreciated that the memory capacity of the universal anti- theft devices is determined by the number of additional resonant oscillating circuits.

When the anti-theft device of the present invention is used, along with the anti-theft effect, a readout of the information stored in the resonant oscillating circuits can also be done over relatively long distances. Since the information stored is embodied as flexible resonant oscillating circuits, the universal anti-theft devices according to the present invention can also continue to be integrated easily into labels or product hang tabs and provided with printed information in the usual way. Moreover, the universal anti-theft devices of the present invention represent an economical solution to the problems presented.

In an advantageous refinement of the universal anti—theft device according to the present invention, it is provided that the resonant frequency of the at least one further electromagnetic resonant oscillating circuit is located outside the resonant frequency of the resonant oscillating circuit for electronic theft protection for goods. The resonant frequency of the resonant oscillating circuit for electronic theft protection is standardized, and for many monitoring systems is 8.2 Mhz.

In a favorable feature of the universal anti-theft device of the present invention, a resonant oscillating circuit is composed of two wound conductor tracks, which are arranged at least partially overlapping, on both sides of a dielectric layer.

In an advantageous refinement of the universal anti-theft device according to the present invention, it is proposed that the resonant oscillating circuit or resonant oscillating circuits, which are used for identification of the articles, are located in the internal region of the resonant oscillating circuit for electronic theft protection, and the internal region is bounded by the inner conductor tracks of the resonant oscillating circuit for electronic theft protection, and the internal region is bounded by the inner conductor tracks of the resonant oscillating circuit for electronic theft protection. This arrangement is very space-saving and makes it possible to retain the thus-far usual sizes of the anti-theft devices for electronic theft protection.

To increase the memory capacity of the universal anti-theft device according to the present invention, it is proposed that a device that has substantially the same dimensions as the universal anti-theft device is equipped with information-carrying resonant oscillating circuits. This additional device is connected to the universal anti-theft device, for instance being firmly glued to the back side thereof.

With regard to the method aspect of the present invention, the object of the present invention is attained in that at least one further electromagnetic resonant oscillating circuit, which contains specific, encoded information about the article, is applied to the substrate.

In an advantageous refinement of the method of the present invention, substantially identical resonant oscillating circuits for identifying articles are used, and the resonant oscillating circuits are subsequently encoded with the specific information. Possible features for later encoding of the resonant oscillating circuits are based on a variation in the characteristic properties of the resonant oscillating circuits. These characteristic properties are: the resonant frequency RF or capacitance K and inductance L, which directly determine the resonant frequency, the resonant amplitude A (RF), and/or the quality Q of the resonant oscillating circuit. One or more of these variables of the resonant oscillating circuits for identifying articles are varied in a defined manner by physical action.

One possibility of encoding the resonant oscillating circuits is that those selected are short-circuited. The short circuit is effected between opposed conductor tracks through the dielectric layer. The methods that can be employed to generate the short circuit are identical to the methods that are already known in conjunction with the deactivation of resonant oscillating circuits for anti-theft protection of articles. One current method is for the resonant oscillating circuit to be pierced at a selected point with a pinlike, optionally heated stylus. It is also possible for opposed conductor tracks to be put in contact with one another by the action of pressure and/or heat. A short circuit can also be achieved by applying a suitably strong electrical field to attain an arc discharge between two opposed conductive regions of the resonant oscillating circuit. The electrical field for creating the short circuit is either furnished via contact electrodes or is generated in contactless fashion, by imposing a sufficiently strong energy pulse on the selected resonant oscillating circuit, in the region of its resonant frequency. As a consequence of an arc discharge, conductive metal of the conductor tracks diffuses into the dielectric layer, thus creating a permanently conductive connection between the coils. One such deactivation method is also described in EP 0 181 327 A2.

In an advantageous refinement of the method of the present invention it is proposed that the resonant oscillating circuits for the identification of the articles are encoded by increasing or decreasing the length of the conductor tracks of the resonant oscillating circuits. One simple method of reducing the length of the conductor tracks provides that a cutting device is used to sever a part (open oscillating circuit) from the resonant oscillating circuit to be encoded.

In an alternative version, a fuse connection is installed at one point of the conductor track of the resonant oscillating circuit to be encoded. This connection melts as a consequence of the increase in temperature, as soon as the current that flows through it exceeds a predetermined value. Once again, the current in the resonant oscillating circuit can be supplied by electrode contact or contactlessly as described above.

An alternative method of encoding the resonant oscillating circuits contemplates that the resonant oscillating circuits for the identification of the articles are encoded by selectively connecting open oscillating circuits (at least one winding) to the resonant oscillating circuits. This changes the resonant frequency of the oscillating circuits. With regard to the connection of the additional winding to this selected resonant oscillating circuit to be encoded, various possibilities present themselves: the winding can be connected in series or in parallel. It is also possible to connect the winding in series, but with the additional winding wound in the opposite direction to that of the windings of the resonant oscillating circuit. By means of these three possible embodiments of connecting at least one additional winding to a resonant oscillating circuit, many different resonant frequencies can therefore be created.

A further possible way of varying the physical properties resides in changing the capacitance of the resonant oscillating circuits. Increasing the capacitance is attained by increasing the area of the surface region in which the conductor tracks of the two coils, separated by the dielectric layer, overlap.

In an advantageous refinement of the method of the present invention, the resonant frequency is varied by combining two at least partly overlapping but separate coils into one short circuited coil. The point at which the short circuit is made subsequently determines the resultant resonant frequency of the encoded resonant oscillating circuit.

In an advantageous refinement of the method of the present invention, the amplitude of the resonant oscillating circuit is varied in a defined way for the sake of the encoding. Advantageously, this is done for instance by connecting the resonant oscillating circuit to be encoded to a conductor track of the resonant oscillating circuit for anti-theft protection of the articles. The latter resonant oscillating circuit then takes on the function of an antenna for the resonant oscillating circuit that is to be encoded.

In the case where there are at least two resonant oscillating circuits for identifying articles, they can also be connected to one another; in that case, one resonant oscillating circuit serves as an antenna for the other.

A third possibility is to connect the resonant oscillating circuit to be encoded to a winding that acts only as an antenna, and whose length can also be selected such that the amplitude of the resonant frequency is varied in a desired way.

A purposeful change in the physical property known as "good quality Q of the resonant oscillating circuit" can be attained for instance by the following method: Short circuits are made between two opposed conductor tracks. Since these short circuits typically have a higher resistance than the conductive conductor tracks, the quality of the resonant oscillating circuit to be encoded is reduced. The definitive factor for changing quality is accordingly the change in resistance of the oscillating circuit. This change can be attained in the following way: since the resistance is inversely proportional to the width of the conductor track, it suffices to vary the width of the conductor track by suitable provisions.

The present invention will be described in further detail in conjunction with the drawings.

DESCRIPTION OF THE PREFERRED EMBODIMENTS

Figure 1:
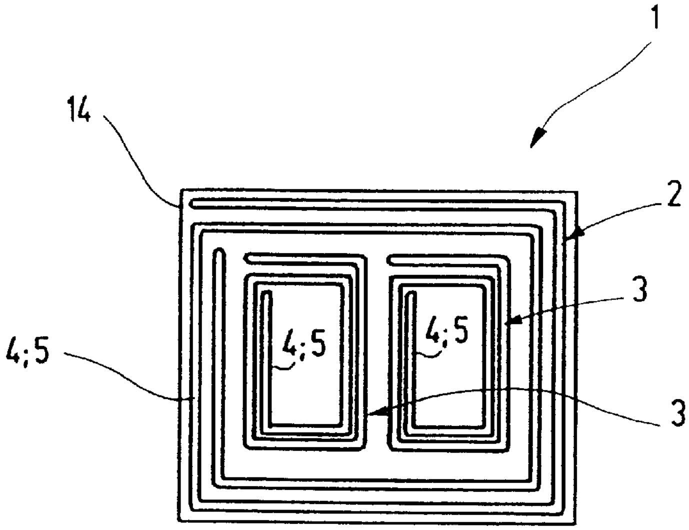
FIG. 1 is a plan view on one embodiment of the anti-theft device of the present invention.

FIG. 1 shows a plan view of an embodiment of the universal anti-theft device 1 according to the present invention. It comprises a resonant oscillating circuit 2, which in the interrogation field of an electronic theft protection system is excited to transmit a characteristic signal and subsequently trips an alarm. The resonant oscillating circuit 2 is disposed in the outer region of a substrate 14 and includes two further resonant oscillating circuits 3, which serve to identify correspondingly theft-protected articles.

Figure 2:
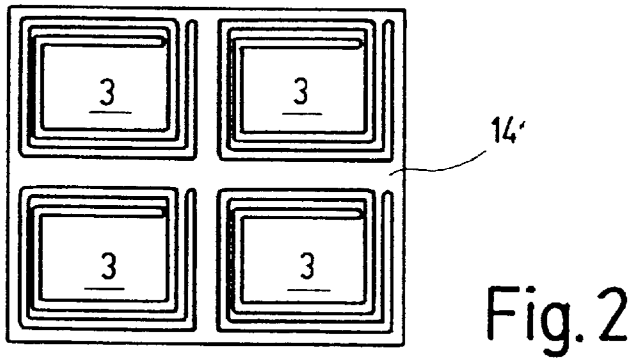
FIG. 2 is a plan view on an arrangement of resonant oscillating circuits for identifying articles.

FIG. 2 shows a plan view of an arrangement of resonant oscillating circuits 3 for identifying articles. This arrangement is intended as an addition to the universal anti-theft device 1 of the present invention and is used to increase the memory capacity by multiple times.

Figure 3:
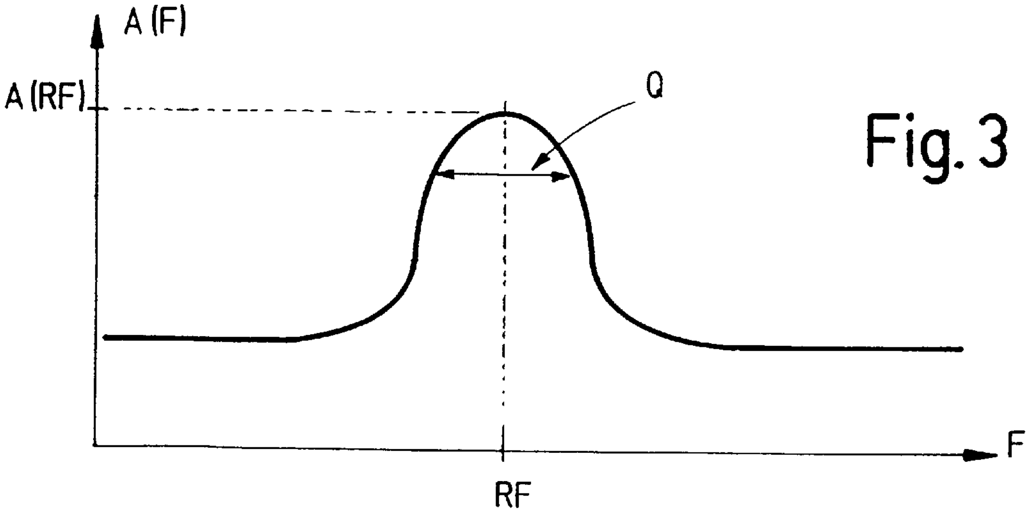
FIG. 3 shows the frequency spectrum of a resonant oscillating circuit.

FIG. 3 shows the typical frequency spectrum of a resonant oscillating circuit 2; 3. It is distinguished by the fact that the amplitude A (F) and thus the intensity of the signal have a pronounced maximum (peak) in a region of the resonant frequency (RF). The quality of a resonant oscillating circuit 2; 3 is defined as the quotient of the resonant frequency RF and a 3 Db bandwidth.

As already explained earlier herein, for the sake of encoding the resonant oscillating circuits for identifying articles, the physical properties of the resonant oscillating circuits are varied in a defined way. The following drawing figures schematically show various possible ways of varying the individual parameters of resonant oscillating circuits. In FIGS. 4*a*–4*e*, various possibilities are shown for how a resonant oscillating circuit 3 can be permanently short-circuited (FIGS. 4*a*–4*c*), or how the current can be interrupted.

Figure 4A:
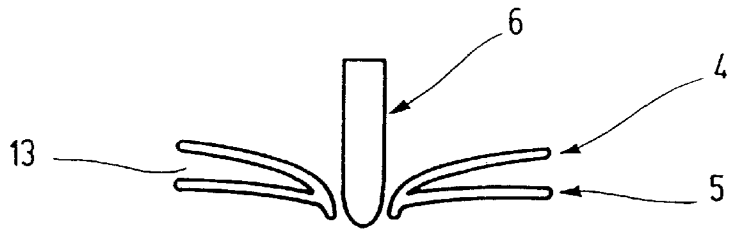
FIG. 4*a* schematically shows a first alternative for short-circuiting a resonant oscillating circuit.
Figure 4B:
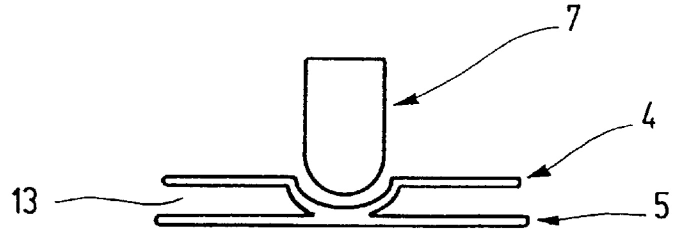
FIG. 4*b* schematically shows a second alternative for short-circuiting a resonant oscillating circuit.
Figure 4C:
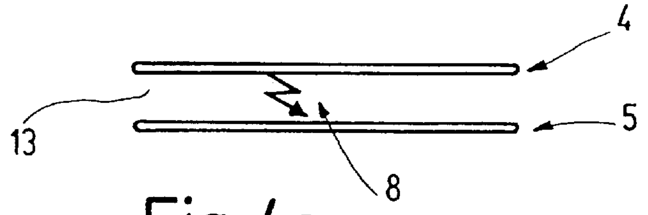
FIG. 4*c* schematically shows a third alternative for short-circuiting a resonant oscillating circuit.
Figure 4D:
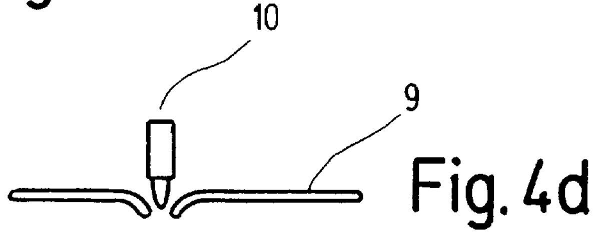
FIG. 4*d* schematically shows a first alternative for varying the resonant frequency of a resonant oscillating circuit.
Figure 4E:
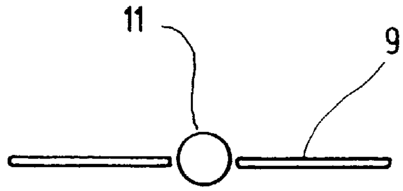
FIG. 4*e* schematically shows a second alternative for varying the resonant frequency of a resonant oscillating circuit.

The short circuit—shown in FIGS. 4*a*–4*c*—is made through the dielectric layer 13. As can be seen in FIG. 4*a*, the resonant oscillating circuit 3 is pierced by means of a pin-like stylus 6, at least in a region of opposed conductor tracks 4, 5. An alternative (FIG. 4*b*) provides that the upper conductor track 4 is pressed against the lower conductor track 5 by means of a specially shaped pressing tool 7. To achieve a complete removal of the dielectric layer 13, the pressure tool 7 is additionally heated.

In addition to these mechanical methods, a short circuit can also—as suggested in FIG. 4*c*—be made through the dielectric layer 13 by means of an electric arc discharge. This requires a suitable strong energy pulse in the region of the resonant frequency of the resonant oscillating circuit. This energy pulse can either be furnished by means of contact electrodes or be emitted by a transmitting device in the form of electromagnetic radiation. Because of the arc discharge, particles of the conductive material—normally, aluminum is used for this purpose—diffuse into the dielectric layer and carbonize it.

Another possible way of deactivating and thus changing the information content of a resonant oscillating circuit is to disconnect the conductor tracks 4, 5. In one embodiment, this is done mechanically—see FIG. 4*d*—by means of a cutting device 10. In an alternative version, a fuse connection (fuse) is built into the conductor track 4, 5; if there is a sufficiently high flow of current through it, the heating causes it to melt and vaporize.

Figure 5A:
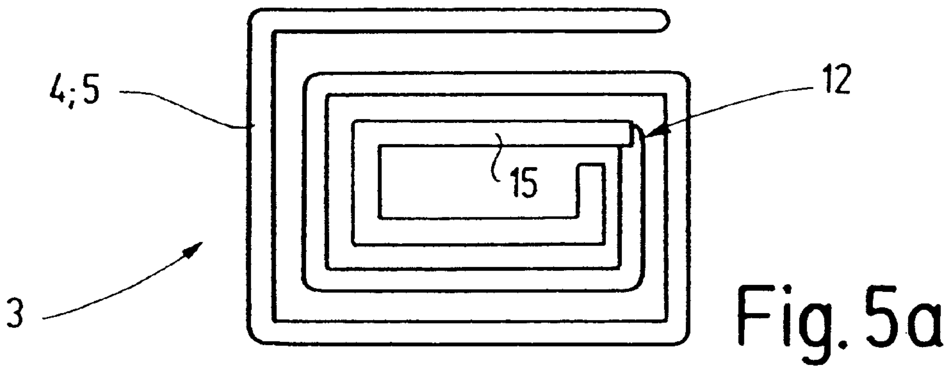
FIG. 5*a* is a schematic illustration of a special feature of the universal anti-theft device of the present invention, in which a conductor track is connected in series.
Figure 5B:
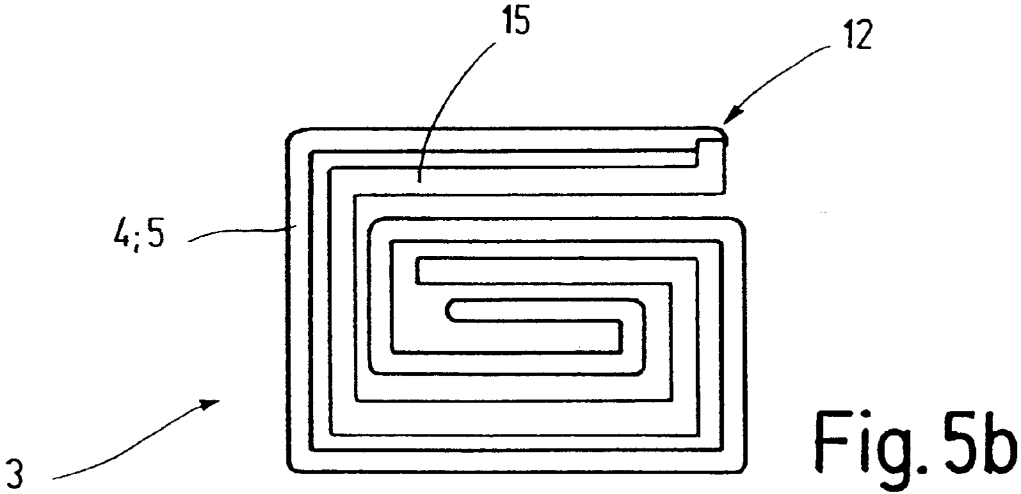
FIG. 5*b* is a schematic illustration of a special feature of the universal anti-theft device of the present invention, in which a conductor track is connected in parallel.
Figure 5C:
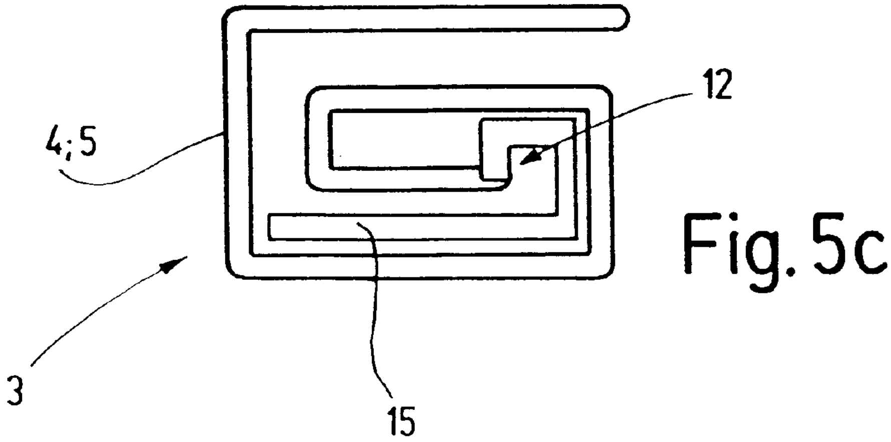
FIG. 5*c* schematically shows a special feature of the universal anti-theft device of the present invention in which a winding, wound in the opposite direction, is connected to the resonant oscillating circuit.

FIG. 5*a* shows a schematic illustration of a special feature of the device of the present invention in which a conductor track is connected serially. In FIG. 5*b* the conductor track is connected in parallel, while FIG. 5*c* relates to the case where a conductor track, which is wound in the opposite direction to the conductor track 4; 5 is connected in series. In each case, these features are capable of changing the resonant frequency of the resonant oscillating circuits 3 in a defined way.

Figure 6:
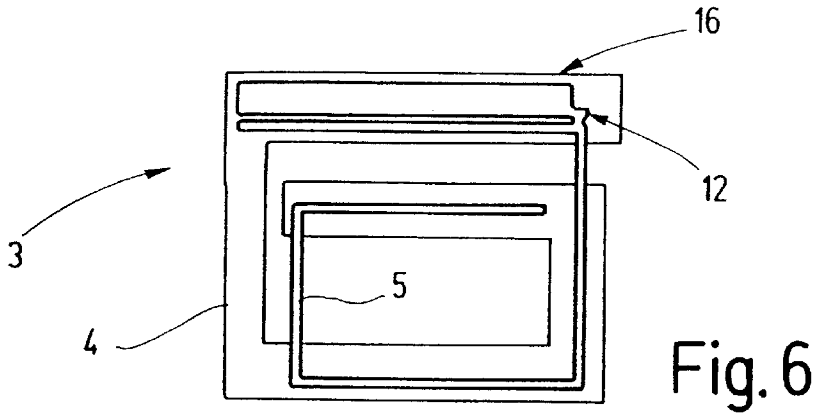
FIG. 6 is a schematic illustration of a special feature of the universal anti-theft device of the present invention with modified capacitance.

A variation in the resonant frequency of a resonant oscillating circuit 3 can also be achieved by increasing or decreasing the capacitance K of the oscillating circuit. FIG. 6 shows the case where the capacitance K is increased by adding a conductor track segment 16 that is placed in such a way that it is opposite a region of the lower conductor track 4 or the upper conductor track 5 of the resonant oscillating circuit 3. The conductor track segment 16 and the conductor track 4; 5 are connected to one another via a connection point 12.

Figure 7:
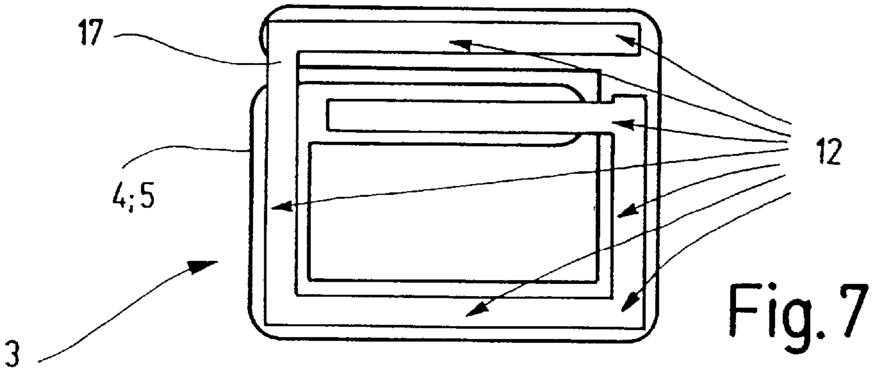
FIG. 7 is a schematic illustration of a second special feature of the universal anti-theft device of the present invention with modified amplitude.

FIG. 7 schematically shows a resonant oscillating circuit 3 in which the resonant frequency is varied by changing two overlapping coils 4; 5 into one coil by a short circuit at one of the connecting points 12. The resultant resonant frequency is dependent on the placement of the connection point 12.

Figure 8:
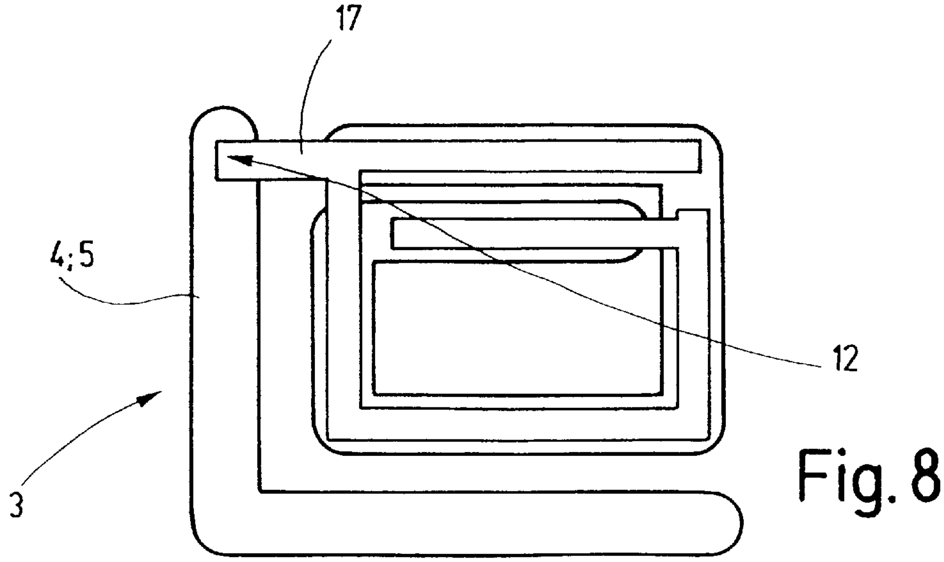
FIG. 8 is a schematic illustration of a special feature of the universal anti-theft device of the present invention with modified quality Q.

FIG. 8 schematically shows a version by way of which the amplitude A (RF) of the resonant frequency can be purposefully varied. In addition to the coil 4; 5 of the resonant oscillating circuit 3, one additional coil 17 is provided, which acts as an antenna for the coil 4; 5 as soon as it is connected to that coil 4; 5 at the connection point 12. Depending on the design of the additional winding 17, the amplitude signal S is varied in a defined way.

In the drawings and in the associated detailed description, reference is always made to resonant oscillating circuits 3 having two coils 4, 5, which are disposed—at least partly overlapping—on both sides of a dielectric layer. It is understood that the present invention is not limited to this embodiment but instead can readily be employed for resonant oscillating circuits that have a coil and a capacitor plate on one side of the dielectric layer 13 and only a capacitor plate on the other side, for example.

What is claimed is:

1. A method for producing a universal anti-theft device for securing articles against theft, comprising the steps of:

providing at least one electromagnetic resonant oscillating circuit on a substrate, said at least one electromagnetic resonant oscillating circuit being excited to transmit a characteristic signal which will subsequently trip an alarm;

providing at least one further electromagnetic resonant oscillating circuit which contains specific, encoded information about the article onto the substrate; and encoding the further electromagnetic resonant oscillating circuit by interrupting the flow of current through conductor tracks included in the further electromagnetic resonant oscillating circuit.

2. A method for producing a universal anti-theft device for securing articles against theft, comprising the steps of:

providing at least one electromagnetic resonant oscillating circuit on a substrate, said at least one electromagnetic resonant oscillating circuit being excited to transmit a characteristic signal which will subsequently trip an alarm;

providing at least one further electromagnetic resonant oscillating circuit which contains specific, encoded information about the article onto the substrate; and encoding the further electromagnetic resonant oscillating circuit by increasing the length of the conductor tracks included in the further electromagnetic resonant oscillating circuit.

3. A method for producing a universal anti-theft device for securing articles against theft, comprising the steps of:

providing at least one electromagnetic resonant oscillating circuit on a substrate, said at least one electromagnetic resonant oscillating circuit being excited to transmit a characteristic signal which will subsequently trip an alarm;

providing at least one further electromagnetic resonant oscillating circuit which contains specific, encoded information about the article onto the substrate; and encoding the further electromagnetic resonant oscillating circuit by decreasing the length of the conductor tracks included in the further electromagnetic resonant oscillating circuit.

4. A method for producing a universal anti-theft device for securing articles against theft, the anti-theft device having a pair of coils, the method comprising the steps of:

providing at least one electromagnetic resonant oscillating circuit on a substrate, said at least one electromagnetic resonant oscillating circuit being excited to transmit a characteristic signal which will subsequently trip an alarm;

providing at least one further electromagnetic resonant oscillating circuit which contains specific, encoded information about the article onto the substrate; and encoding the further electromagnetic resonant oscillating circuit by contacting an additional conductor track segment to one of said coils so that the additional conductor track segment is opposite to the other coil.

* * * * *